(12) United States Patent
Weir et al.

(10) Patent No.: US 9,582,597 B2
(45) Date of Patent: Feb. 28, 2017

(54) SYSTEM AND METHOD FOR CREATING USER-SPECIFIC DIRECTORY

(75) Inventors: Robert Cameron Weir, Westford, MA (US); Barry E. Willner, Briarcliff Manor, NY (US); Patrick Joseph O'Sullivan, Ballsbridge (IE); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1783 days.

(21) Appl. No.: 11/782,892

(22) Filed: Jul. 25, 2007

(65) Prior Publication Data
US 2009/0030878 A1    Jan. 29, 2009

(51) Int. Cl.
*G06F 17/30* (2006.01)

(52) U.S. Cl.
CPC .... *G06F 17/3089* (2013.01); *G06F 17/30699* (2013.01)

(58) Field of Classification Search
CPC ............. G06F 17/30699; G06F 17/241; G06F 17/3089
USPC ........................ 707/736, 758, 748
See application file for complete search history.

(56) References Cited

U.S. PATENT DOCUMENTS

| | | | |
|---|---|---|---|
| 6,820,083 B1 * | 11/2004 | Nagy et al. | |
| 6,834,195 B2 | 12/2004 | Brandenberg et al. | |
| 7,023,979 B1 | 4/2006 | Wu et al. | |
| 7,526,561 B2 * | 4/2009 | Bloch et al. | 709/229 |
| 2004/0148275 A1 | 7/2004 | Achlioptas | |
| 2005/0102257 A1 * | 5/2005 | Onyon et al. | 707/1 |
| 2006/0200432 A1 | 9/2006 | Flinn et al. | |
| 2007/0061567 A1 * | 3/2007 | Day et al. | 713/159 |

FOREIGN PATENT DOCUMENTS

WO    WO2006059954 A1    6/2006

OTHER PUBLICATIONS

"Bells & Whistles for Outlook" (as archived Apr. 13, 2005 on archive.org) http://web.archive.org/web/20050413001629/http://emailaddressmanager.com/outlook/contacts.html.*
Gao et al, Adaptive Social Network-inspired Approach to Resource Discovery for the Complex Grid Systems, International Journal of General Systems, vol. 35 issue 3, Jun. 2006, pp. 347-360.
Musolesi et al., Adapting Asynchronous Messaging Middleware to Ad Hoc Networking, Middleware 2004 Companion, pp. 121-126.
Kobsa et al., Privacy Through Pseudonymity in User-Adaptive Systems, ACM Transactions on Internet Technology, vol. 3, No. 2, May 2003, pp. 149-183.

* cited by examiner

*Primary Examiner* — Vincent Boccio
(74) *Attorney, Agent, or Firm* — Brian J. Colandreo, Esq.; Jeffrey T. Placker, Esq.; Holland & Knight LLP

(57) ABSTRACT

A system and method for generating user-centric directories including analyzing a plurality of relationships of a user. A contact directory for the user is defined based upon the plurality of relationships of the user.

22 Claims, 5 Drawing Sheets

SYSTEM AND METHOD FOR CREATING USER-SPECIFIC DIRECTORY

TECHNICAL FIELD

This disclosure relates to contact directories and, more particularly, to systems and methods for creating user-specific contact directories.

BACKGROUND

Oftentimes individuals in an organization require contact and personnel information from peers across the organization. Such information may pertain to employee contact information, employee location or department, employee manager information, and so on. Such information may be found in a corporate directory, e.g., which may include contact information and corporate organization structure. Typically, a corporate directory may be accessed from a browser, rich client, PDA client, cellular phone, and similar devices/application.

Situations may arise in which an individual is disconnected from the network (e.g. working off-line, on the road, in a meeting room with no network connectivity, on a train), but may require information on a peer, for example to make contact with a peer. In conventional systems, in which a corporate directory is accessible via a network such as the internet, the individual may be unable to look up the peers contact information. To overcome this problem, the individual may have the ability to replicate the entire corporate directory locally for accessing off-line.

In large organizations, replicating an entire directory locally may not be feasible or desirable. For example, when using memory constrained devices (such as PDA's or cellular phones), the device may not have the memory resources to store a multi-thousand employee corporate directory. Issues associated with the size of the directory are sometimes resolved by eliminating some of the content to reduce the off-line footprint. For example, the off-line directory may only include user name and contact number, removing photo/images, organizational position, and such. However, removing some of this content may challenge or dilute specifics of a query that an off-line user may have.

Even if the off-line footprint is not limited, an individual may not need or desire the entire corporate directory. For example, the individual may only regularly interact with a relatively small number of peers. It may be considered cumbersome and undesirable to have to search through an entire corporate directory for the desired information every time contact information is needed.

SUMMARY OF THE DISCLOSURE

In a first implementation, a method includes analyzing a plurality of relationships of a user. A contact directory for the user is defined based upon at least a portion of the plurality of relationships of the user.

One or more of the following features may be included. The plurality of relationships of the user may include one or more of: email communications, instant messaging chats, voice communications, scheduled calendar events, and travel itineraries. Defining the contact directory for the user includes populating one or more contact directory fields based upon, at least in part, information from the plurality of relationships of the user. Defining the contact directory for the user includes populating one or more contact directory fields based upon, at least in part, one or more user defined preferences.

One or more fields of the contact directory for the user may be populated based upon, at least in part, information from a general directory. The general directory may include a corporate directory. Populating the one or more fields of the contact directory may include populating one or more fields of the contact directory based upon, at least in part, an organizational hierarchy defined by the corporate directory. The contact directory for the user may be modified based upon, at least in part, a change in a general directory. The user may be notified of the change in the general directory.

The contact directory for the user may be made available off-line.

According to another implementation, a computer program product may reside on a computer readable medium, which may have a plurality of instructions stored thereon. When executed by a processor, the instructions cause the processor to perform operations including analyzing a plurality of relationships of a user. The instructions further cause the processor to define a contact directory for the user based upon at least a portion the plurality of relationships of the user.

One or more of the following features may be included. The plurality of relationships of the user include one or more of: email communications, instant messaging chats, voice communications, scheduled calendar events, and travel itineraries. Defining the contact directory for the user may include populating one or more contact directory fields based upon, at least in part, information from the plurality of relationships of the user. Additionally, the instructions for defining the contact directory for the user may include instructions for populating one or more contact directory fields based upon, at least in part, one or more user defined preferences.

One or more fields of the contact directory for the user may be populated based upon, at least in part, information from a general directory. The general directory may include a corporate directory. The instructions for populating one or more fields of the contact directory may include instructions for populating one or more fields of the contact directory based upon, at least in part, an organizational hierarchy defined by the corporate directory. The contact directory for the user may be modified based upon, at least in part, a change in a general directory. The user may be notified of the change in the general directory.

The computer program product may further include instructions for making the contact directory for the user available off-line.

The details of one or more implementations are set forth in the accompanying drawings and the description below. Other features and advantages will become apparent from the description, the drawings, and the claims.

DETAILED DESCRIPTION

Figure 1:
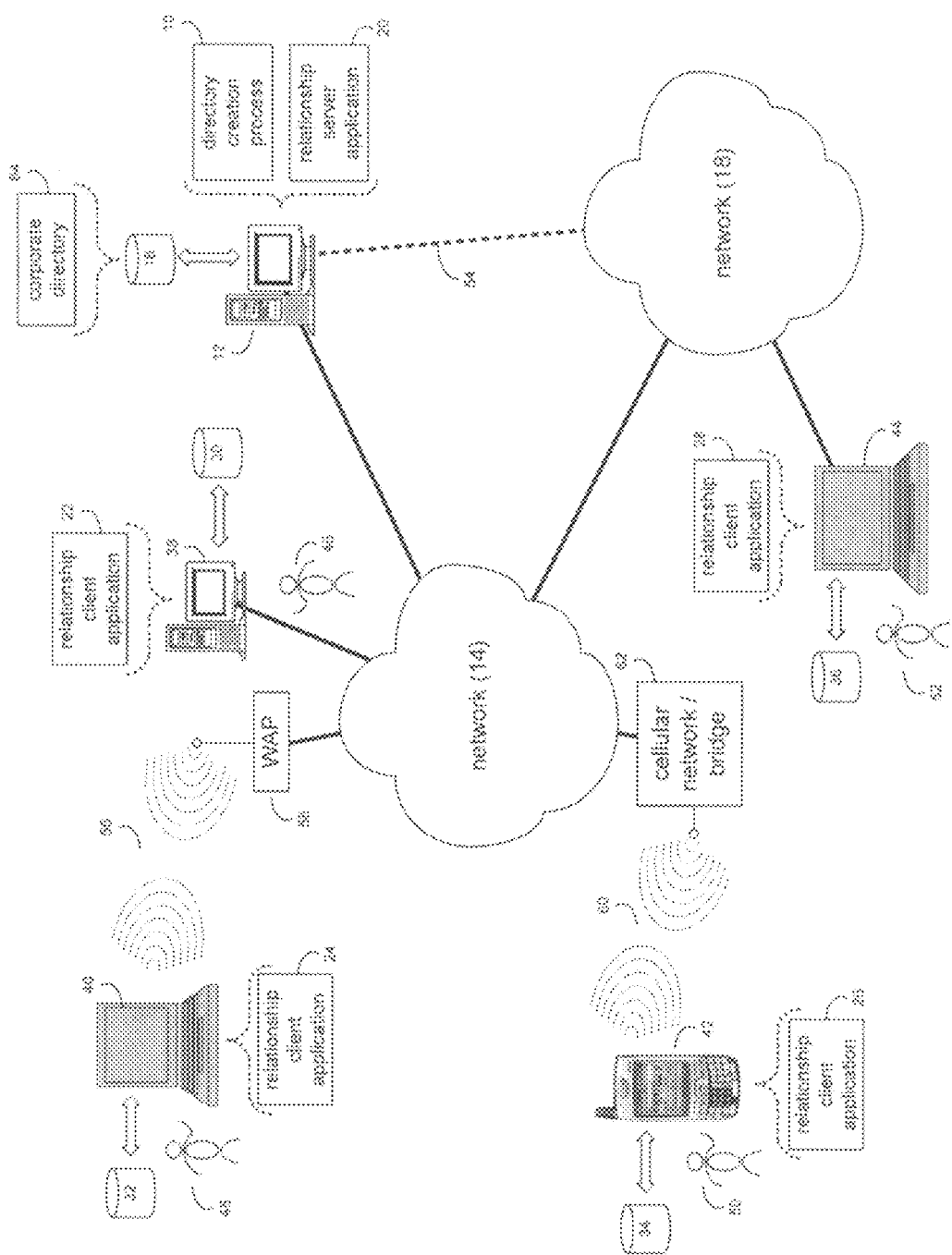
FIG. 1 diagrammatically depicts a directory creation process and a relationship application coupled to a distributed computing network.

Referring to FIG. 1, there is shown directory creation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, directory creation process may reside on a client electronic device, such as a personal computer, notebook computer, personal digital assistant, or the like. As will be discussed below in greater detail, directory creation process 10 may allow a user to create a contact directory in the form of a user-specific contact directory. The user-specific contact directory may be based upon, at least in part, one or more relationships of the user. To accomplish this, directory creation process may analyze one or more relationships of the user and may define a user-specific contact directory for the user based upon at least a portion of the one or more relationships.

Directory creation process 10 may analyze relationships of a user including, but not limited to, the user's email communications, instant messaging chats, voice communications, events scheduled in a calendar or appointment scheduling applications, and travel itineraries, for example. The user-specific contact directory may include, for example, contact information for one or more other users, including, but not limited to, email addresses, instant messaging user identification, telephone numbers, mailing addresses, company and position information, biographical information, and the like.

The instruction sets and subroutines of directory creation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more relationship server applications (e.g., relationship server application 20), examples of which may include but are not limited to email server applications that may include calendar and/or scheduling modules or components (e.g., Lotus Domino™ Server and Microsoft Exchange™ Server), instant messaging server applications (e.g., IBM Lotus Sametime™, Microsoft Office Live Communications Server™, Jabber XCP™, and AOL Instant Messenger™), voice over IP server applications or PBX telephone systems. Relationship server application 20 may interact with relationship client applications 22, 24, 26, 28, examples of which may include, but are not limited to, email client applications that may include calendar and/or scheduling modules (e.g., Lotus Notes™ and Microsoft Outlook™), instant messaging client applications (e.g., AOL Instant Messenger™, IBM Lotus Sametime™, Google Talk™), voice over IP client applications, and softphone applications. Directory creation process 10 may be a stand alone application that interfaces with relationship server application 20 or may be an applet/application that is executed within relationship server application 20.

The instruction sets and subroutines of relationship server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the directory creation process may be a client-side application (not shown) residing on one or more client electronic device 38, 40, 42, 44 (e.g., stored on storage device 30, 32, 34, 36, respectively). As such, the directory creation process may be a stand alone application that interfaces with a relationship client application (e.g., relationship client applications 22, 24, 26, 28), or may be an applet/application that is executed within a relationship client application. As such, the directory creation process may be a client-side process, a server-based application, or a hybrid client-side/server-based process, which may be executed, in whole or in part, by server computer 12, or one or more of client electronic device 38, 40, 42, 44.

The instruction sets and subroutines of relationship client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using relationship client applications 22, 24, 26, 28, users 46, 48, 50, 52 may engage in relationship activities (e.g., send/receive email communications, conduct instant messaging chats, schedule calendar events, conduct telephone conversations, and similar activities). Engaging in relationship activities may include accessing relationship server application 20.

Users 46, 48, 50, 52 may access relationship server application 20 directly through the device on which the relationship client application (e.g., relationship client applications 22, 24, 26, 28) is executed, namely client electronic devices 38, 40, 42, 44, for example. Users 46, 48, 50, 52 may access relationship server application 20 directly through network 14 or through secondary network 18. Further, server computer 12 (i.e., the computer that executes relationship server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Directory Generation Process

Figure 2:
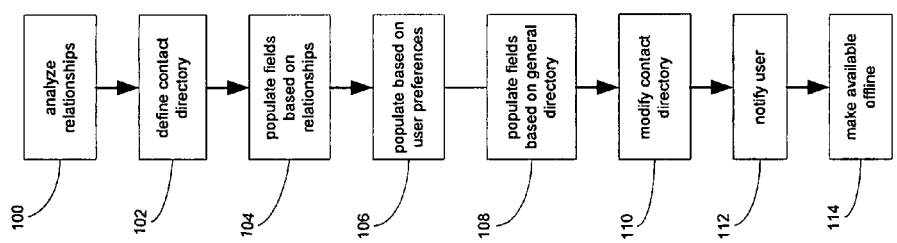
FIG. 2 is a flowchart of a process executed by the directory creation process of FIG. 1.

Referring also to FIG. 2, directory creation process 10 may analyze 100 a plurality of relationships of a user, and may define 102 a user-specific contact directory based upon at least a portion of the relationships of the user. The relationships of the user may be conducted using one or more client electronic device (e.g., client electronic devices 38, 40, 42, 44, for example) and/or may involve interaction with server computer 12.

The plurality of relationships of the user may include, for example, one or more of: email communications, instant messaging chats, voice communications, scheduled calendar events, and travel itineraries, and inclusion in a work group (e.g., team or department). Continuing with the example of FIG. 1, user 46 may send and/or receive an email from user 48. Additionally, user 46 may conduct an instant messaging chat with user 50. User 46 may schedule a meeting with user 52. The scheduled meeting with user 52 may be explicit (e.g., a meeting may be scheduled between user 46 and user 52, or user 46 may accept a meeting schedule from user 52) or may be implicit (e.g., user 46 and user 52 may each be scheduled for a meeting at the same time and place). Furthermore, user 46 may initiate and/or receive a telephone call from another user (e.g., which may be logged by an enterprise telephone system or a caller ID system/module). User 46, 48, and 50 may also take a business trip together (e.g., evidenced based on group travel arrangements, commonly scheduled events in a calendar application, or the like).

User 46 may use/access one or more relationship client application (e.g., relationship client applications 22) and/or relationship server applications (e.g., relationship server application 20). Continuing with the above-stated example, user 46 may send/recieve the email from user 48 via an email application. Similarly, user 46 may conduct the instant messaging chat with user 50 via an instant messaging application. User 46 may initiate/recieve a telephone call via a voice communication application, and may schedule a meeting with user 52 via a calendar/scheduling application.

Figure 3:
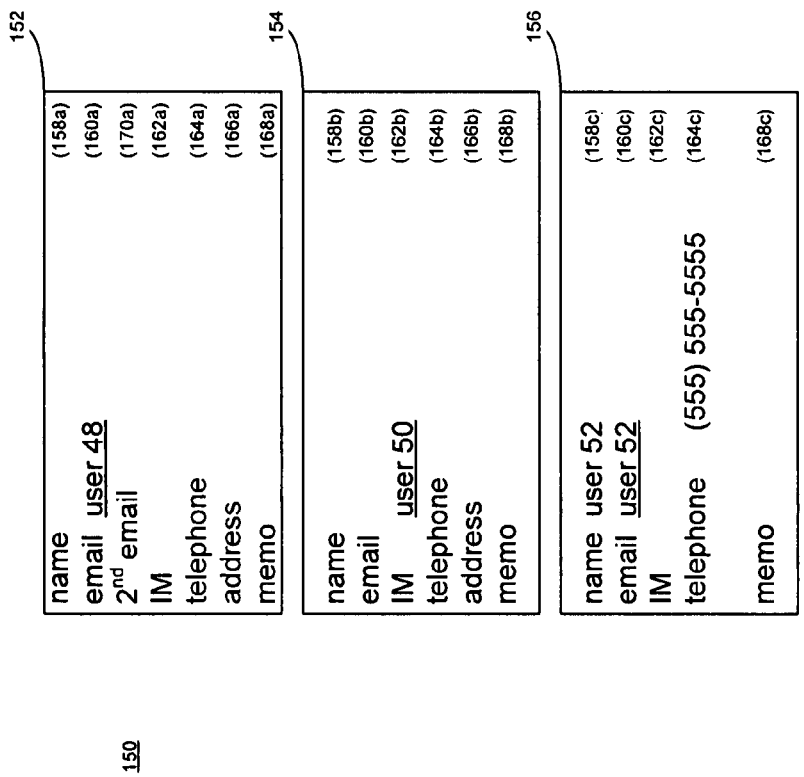
FIG. 3 is a diagrammatic view of a user-specific contact directory created by directory creation process.

Referring also to FIG. 3, a user-specific contact directory 150 for user 46 is shown. The user-specific contact directory 150 may include one or more directory entries (e.g., entries 152, 154, 156). Each directory entry 152, 154, 156 may define one or more information field, including but not limited to, "name" field 158-c, "email" field 160a-c, "IM" field 162a-c, "telephone" field 164a-c, "address" field 166a-b, and "memo" field 168a-c.

Directory creation process 10 may populate 104 one or more user-specific contact directory field (e.g., fields 158a-c, 160a-c, 162a-c, 164a-c, 166a-b, 168a-c) based upon, at least in part, information from the one or more relationships of the user. Continuing with the above stated example, directory entry 152 may be associated with user 48, with whom user 46 communicates via email. Directory creation process 10 may populate 104 "email" field 160a with the email address of user 48 (i.e., user48), based upon the email address of the email communications. Similarly, directory entry 154 may be associated with user 50, with whom user 46 conducts an instant messaging chat. Directory creation process 10 may populate 104 "IM" field 162b with the instant messaging ID of user 50 (i.e., user 50IM), which was used during the instant messaging chat with user 46. Directory entry 156 may be associated with user 52, with whom user 56 attends a meeting. Directory creation process 10 may populate 104 "name" field 158c, "email" field 160c, and "telephone" field 164c with the corresponding information for user 52 (i.e., user 52, user52, (555) 555-0052, respectively), e.g., that was provided as part of the meeting schedule.

Directory creation process 10 may populate 106 one or more field of the user-specific contact directory based upon, at least in part, one or more user defined preferences. Continuing with the above-stated example, in FIG. 3 directory entries 152, 154, 156 may include "name" field 158-c, "email" field 160a-c, "IM" field 162a-c, "telephone" field 164a-c, "address" field 166a-b, and "memo" field 168a-c. User 46 may add and/or remove fields from one or more of the directory entries (e.g., directory entry 152, 154, 156). For example, directory creation process 10 may allow user 46 to add "$2^{nd}$ email" field 170 to directory entry 152. As such, user 46 may include second email address associated with user 48 (i.e., user48(2)). Similarly, directory creation process 10 may allow user 46 to delete the address field from directory entry 156. As such, user 46 may be allowed to customize individual entries, deciding what fields are included with the various entries. User 46 may also be allowed to make blanket changes that applied to all of the directory entries.

Depending upon the nature of the interaction, various relationship activities may provide differing types and amounts of information for each user involved in the relationship. However, the relationship interaction may not provide all of the information to fully populate one or more of the directory entries. Directory creation process 10 may populate 108 one or more fields of the contact directory based upon, at least in part, information from one or more general directories. The information from the one or more general directories may supplement information from the one or more relationships. A general directory may include, for example, a corporate directory (e.g., corporate directory 64 stored on storage device 16 coupled to server computer 12). Directory creation process 10 may, for example, use information from the general directory to more fully populate 108 one or more field of one or more directory entry Continuing with the above-stated example, an email from user 48 may include the user 48's email address (i.e., user48) and a display name (i.e., user 48) associated with the email address. Other information may not be available from the email. Instant messaging chats with user 50 may provide user 50's name (i.e., user 50) and instant messaging ID (i.e., user 50IM). Similarly, the meeting schedule with user 52 may provide user 46 with user 52's name (i.e., user 50), email address (i.e., user52), and telephone number (i.e., (555) 555-0052). The remaining fields of the directory entries associated with each user (i.e., directory entries 152, 154, 156) may not be populated from the relationship interaction alone.

Figure 4:
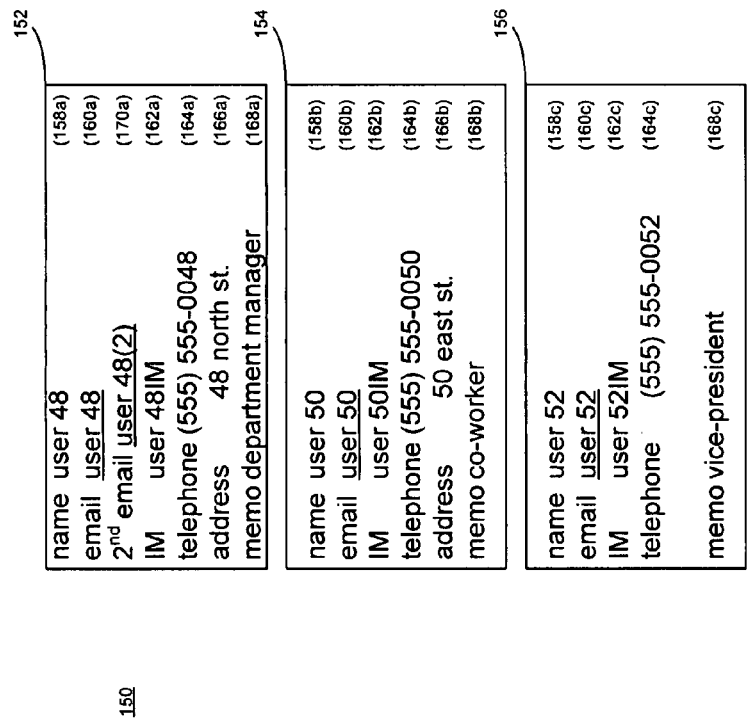
FIG. 4 is a diagrammatic view of a user-specific contact directory created by directory creation process.

Directory creation process 10 may reference the general directory (e.g., corporate directory 64), for example, using the information obtained from the relationship interaction. As shown in FIG. 4, using information obtained from corporate directory 64, directory creation process 10 may populate 108 one or more field of directory entries 152, 154, 156. As such, directory creation process 10 may provide more completely populated directory entries 152, 154, 156.

Similarly, directory creation process 10 may populate 108 one or more field to create a new and/or additional directory entry based upon, at least in part, a recognized relationship (e.g., based on established and/or selected policies). For example, based upon, at least in part, corporate directory 64, directory creation process 10 may create an entry, and populate 108 the fields of the entry, for all of user 46's peers (e.g., coworkers on a commonly assigned project or within the same department) and/or for all of user 46's managers (e.g., project manager, department head, an such). As such, directory creation process 10 may imply relationships (e.g., based on established and/or selected policies) and may populate one or more field of a directory entry with the associated information.

Continuing with the above-stated example, directory creation process 10 may define 102 a user-specific contact directory for a user based upon, at least in part, the user's social network. In part, the user's social network may include people with whom the user has a relationship, e.g., as indicated by email, instant messaging, and voice communications, and by common appointments and travel arrangements, as discussed above. Additionally, the user's social network may include people with whom the user works, e.g., based upon, at least in part, a corporate, or similar, directory (e.g., associations by department, work group, and the like indicated in a corporate directory), also as discussed above. The people included in the user's social network based upon a corporate or similar directory may be selected based upon, at least in part, degree of separation within an organizational hierarchy. For example, the user's peers may be located within a common hierarchal tier as the user, and the user's immediate supervisor may be located one tier above the user (e.g., one degree of separation). The user's social network may include people within a defined degree of separation of the user (e.g., one or two degrees of separation above and below the user). The defined degree of separation may be defined by the user or by a general policy and may be determined, at least in part, to encompass the people the user may likely interact with. Additionally, the social network may include a specific group within the organization structure (e.g., a given department or branch of the organizational hierarchy). Various other mechanisms for defining the user's social network may also be used.

Directory creation process 10 may modify 110 the user-specific contact directory based upon, at least in part, a change in a general directory (e.g., corporate directory 64). For example, one or more of the attributes (e.g., email address, instant messaging ID, telephone number, and such) associated with a user (having an associated entry in the user-specific contact directory) may change over time (e.g. due to transfers, change in job, moving). A general directory (e.g., corporate directory 64) may be updated to reflect the changes in the attributes associated with the user. Directory creation process 10 may modify 110 the user-specific directory to also reflect the changes in the attributes associated with the user.

Figure 5:
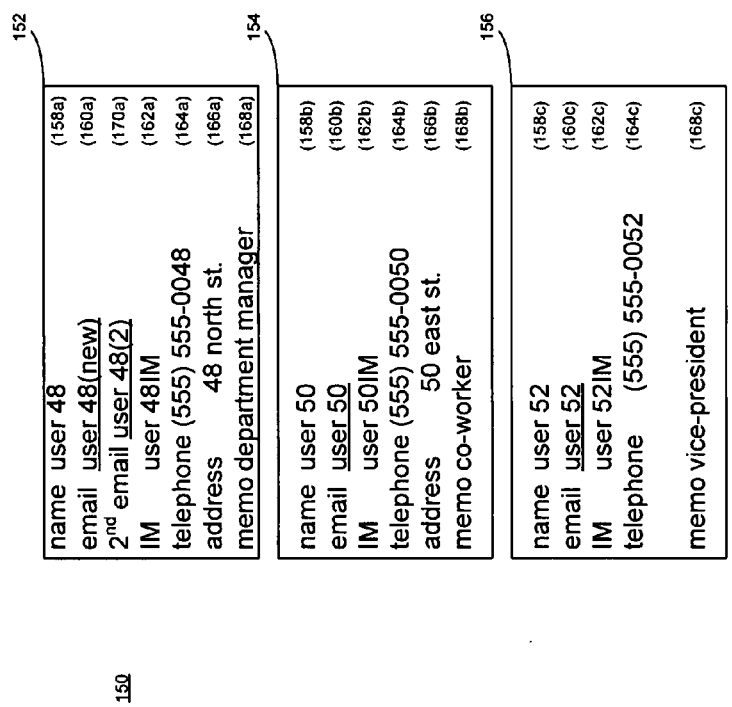
FIG. 5 is a diagrammatic view of a user-specific contact directory created by directory creation process.

Continuing with the above stated example, one or more of the fields (e.g., field 58a, 60a, 62a, 64a, 66a, 68a, 70a) of directory entry 152 associated with user 48 in user-specific contact directory 150 may have been populated 104 based upon information resulting from the relationship interaction with user 46 and/or may have been populated 108 based upon information from a general directory. For example, at the time directory entry 152 was created user 48 may have had an email address user48, as reflected in "email" filed 160a in FIG. 4. At some time after directory entry 152 was initially created, user 48's email address may change (e.g., to user 48(new)). The change in user 48's email address may be reflected in, for example, corporate directory 64. Referring also to FIG. 5, directory creation process 10 may modify 110 "email" field 160a of directory entry 152 associated with user 48 to correspond to the change in user 48's email address, which is reflected in the corporate directory.

Similarly, directory creation process 10 may modify 110 one or more field of a directory entry to reflect other changes, e.g., personnel changes. For example, user 48 may be user 46's manager at the time directory entry 152 was initially created. Subsequently, user 48 may be replaced with a new manager. Based upon, at least in part, the change in organization structure, e.g., reflected in corporate directory 64, directory creation process 10 may create a directory entry for user 46's new manager, and may populate one or more field of the directory entry with associated information. Various other modification of user-specific contact directory may also be made by directory creation process 10 based upon, at least in part, changes in a general directory.

Directory creation process 10 may compare directory entries 152, 154, 156 in user-specific contact directory 150 to a general directory based upon, at least in part, various policies. For example, directory creation process 10 may compare user-specific contact directory 150 to one or more general directory on a predetermined schedule (e.g., once a day, once a week, once a month). Additionally/alternatively, directory creation process 10 may compare the user-specific contact directory to the general directory whenever directory creation process 10 is executed. Various other policies may be implemented for comparing the user-specific contact directory to the general directory.

Directory creation process 10 may notify 112 the user of a change in the general directory. For example, directory creation process 10 may notify 112 the user of a change in the general directory in comparison to the user-specific contact directory in addition/as an alternative to modifying 110 the user-specific contact directory. For example, in the event of a change in the general directory compared to the user-specific contact directory, directory creation process 10 may notify the user of the change and prompt the user to accept or reject modification of the user-specific contact directory to correspond with the general directory.

Directory creation process 10 may notify 112 the user of the change, e.g., via a popup, email, instant messaging notice, etc. Directory creation process 10 may notify 112 the user of the change as soon as the change is recognized by directory creation process 10. Similarly, directory creation process may notify 112 the user of the change the first time the user-specific directory is accessed once the change is recognized by directory creation process 10. Additionally/alternatively, directory creation process 10 may notify 112 the user of the change the first time the user attempts to access the changed directory entry after the change is recognized by directory creation process 10.

Directory creation process 10 may make 114 the user-specific contact directory available offline. For example, directory creation process 10 may allow a user to download the user-specific contact directory to a client electronic device (e.g., client electronic devices 38, 40, 42, 44). As such, the user-specific contact directory may be accessible by the user via the client electronic device, for example, even when the client electronic device is not connected to a network (e.g., networks 14, 16).

The user-specific contact directory created by directory creation process 10 may provide a user with a more valuable contact directory, e.g., as compared to a general contact directory, such as a corporate directory. For example, while the user may have access to a complete corporate directory (e.g., including the complete information of all of the employees of the corporation) the user may typically only interact with a relatively small portion of the employees of the corporation. It may be cumbersome to have to sort through an entire corporate directory (e.g., to find an email address or phone number of a desired contact) every time the user wants to interact with an individual. Additionally, user-specific contact directory may be relatively small, as compared to an entire corporate directory that may be relatively large. The smaller size of the user-specific contact directory may be more manageable, e.g., for use with memory constrained device, such as a PDA, cellular phone, etc.

In addition to providing the convenience of size and accessibility of contacts that are most relevant to the user, the user-specific contact directory may also provide the convenience of being an organic construct that may evolve as the individuals that a user interacts with changes. For example, the directory creation process 10 may add new people to the user-specific directory that the user begins interacting with, removes those that the user has not interacted with for a long time.

A number of implementations have been described. Nevertheless, it will be understood that various modifications may be made. Accordingly, other implementations are within the scope of the following claims.

What is claimed is:

1. A method comprising:
   analyzing a plurality of relationships of a user with one or more other users listed in a corporate directory that is available to the user when the user is online, wherein analyzing the plurality of relationships of the user includes analyzing the plurality of relationships of the user with the one or more other users within a social network associated with the user, wherein the one or more other users included within the social network associated with the user are determined based upon, at least in part, a degree of separation between the user and the one or more other users within an organizational hierarchy defined by the corporate directory;
   creating a contact entry of a user-specific contact directory based upon, at least in part, information resulting from an interaction with one of the plurality of relationships of the user and the plurality of relationships of the user with the one or more other users within the social network likely to interact with the user;
   populating one or more fields of the contact entry based upon, at least in part, the information resulting from the interaction with the one of the plurality of relationships of the user and the plurality of relationships of the user with the one or more other users within the social network likely to interact with the user, wherein the contact entry and the user-specific contact directory are available to the user when the user is offline; and
   comparing the user-specific contact directory to the corporate directory on a predetermined schedule to detect changes between the user-specific contact directory and the corporate directory.

2. The method of claim 1, wherein the plurality of relationships of the user includes one or more of: email communications, instant messaging chats, voice communications, scheduled calendar events, and travel itineraries.

3. The method of claim 1, wherein defining the user-specific contact directory for the user includes populating one or more fields of the contact entry based upon, at least in part, one or more user defined preferences.

4. The method of claim 1, further including populating one or more fields of the contact entry of the user-specific contact directory for the user based upon, at least in part, information from a general directory.

5. The method of claim 1, wherein populating one or more fields of the contact entry of the user-specific contact directory includes populating one or more fields of the contact entry based upon, at least in part, the organizational hierarchy defined by the corporate directory.

6. The method of claim 1, further including modifying the contact entry for the user based upon, at least in part, a change in a general directory.

7. The method of claim 6, further including notifying the user of the change in the general directory via at least one of a popup notification, an email notification, and an instant messaging notification.

8. The method of claim 7 wherein notifying the user includes prompting the user to accept or reject a change in the user-specific contact directory to correspond to the change in the general directory.

9. The method of claim 1, wherein at least one of the plurality of relationships is based upon, at least in part, at least one of sending an email to another user and receiving an email from another user.

10. The method of claim 1, wherein the plurality of relationships of the user includes two or more of: email communications, instant messaging chats, voice communications, scheduled calendar events, and travel itineraries.

11. The method of claim 1, wherein the plurality of relationships of the user includes: email communications, instant messaging chats, voice communications, and scheduled calendar events.

12. The method of claim 1, further including updating the user-specific contact directory based upon, at least in part, a change in the organizational hierarchy, including creating a new contact entry and populating one or more fields of the new contact entry for a new member within at least one degree of separation above the user in the organizational hierarchy.

13. A computer program product residing on a non-transitory computer readable medium having a plurality of instructions stored thereon which, when executed by a processor, cause the processor to perform operations comprising:

analyzing a plurality of relationships of a user with one or more other users listed in a corporate directory that is available to the user when the user is online, wherein analyzing the plurality of relationships of the user includes analyzing the plurality of relationships of the user with the one or more other users within a social network associated with the user, wherein the one or more other users included within the social network associated with the user are determined based upon, at least in part, a degree of separation between the user and the one or more other users within an organizational hierarchy defined by the corporate directory;

creating a contact entry of a user-specific contact directory based upon, at least in part, information resulting from an interaction with one of the plurality of relationships of the user and the plurality of relationships of the user with the one or more other users within the social network likely to interact with the user;

populating one or more fields of the contact entry based upon, at least in part, the information resulting from the interaction with the one of the plurality of relationships of the user, wherein the contact entry and the user-specific contact directory are available to the user when the user is offline and the plurality of relationships of the user with the one or more other users within the social network likely to interact with the user; and comparing the user-specific contact directory to the corporate directory on a predetermined schedule to detect changes between the user-specific contact directory and the corporate directory.

14. The computer program product of claim 13, wherein the plurality of relationships of the user include one or more of: email communications, instant messaging chats, voice communications, scheduled calendar events, and travel itineraries.

15. The computer program product of claim 13, wherein the instructions for defining the user-specific contact directory for the user include instructions for populating one or more fields of the contact entry based upon, at least in part, one or more user defined preferences.

16. The computer program product of claim 13, further including instructions for populating one or more fields of the contact entry of the user-specific contact directory for the user based upon, at least in part, information from a general directory.

17. The computer program product of claim 13, wherein the instructions for populating one or more fields of the contact entry of the user-specific contact directory include instructions for populating one or more fields of the contact entry based upon, at least in part, the organizational hierarchy defined by the corporate directory.

18. The computer program product of claim 13, further including instructions for modifying the contact entry for the user based upon, at least in part, a change in a general directory.

19. The computer program product of claim 18, further including instructions for notifying the user of the change in the general directory via at least one of a popup notification, an email notification, and an instant messaging notification.

20. The computer program product of claim 19 wherein notifying the user includes prompting the user to accept or reject a change in the user-specific contact directory to correspond to the change in the general directory.

21. The computer program product of claim 13, wherein at least one of the plurality of relationships is based upon, at least in part, at least one of sending an email to another user and receiving an email from another user.

22. The computer program product of claim 13, further including updating the user-specific contact directory based upon, at least in part, a change in the organizational hierarchy, including creating a new contact entry and populating one or more fields of the new contact entry for a new member within at least one degree of separation above the user in the organizational hierarchy.

* * * * *